(12) United States Patent
Yin et al.

(10) Patent No.: US 10,330,802 B2
(45) Date of Patent: Jun. 25, 2019

(54) DETERMINING A PAIR OF COMPLIANCE EVENTS (71) Applicant: SHENYANG NEUSOFT MEDICAL SYSTEMS CO., LTD., Shenyang (CN)

(72) Inventors: Zhuxia Yin, Shenyang (CN); Zhiguo Wang, Shenyang (CN); Guoxu Zhang, Shenyang (CN); Guodong Liang, Shenyang (CN); Long Yang, Shenyang (CN)

(73) Assignee: Shenyang Neusoft Medical Systems Co., Ltd., Shenyang (CN)

( * ) Notice: Subject to any disclaimer, the term of this patent is extended or adjusted under 35 U.S.C. 154(b) by 221 days.

(21) Appl. No.: 15/275,157

(22) Filed: Sep. 23, 2016

(65) Prior Publication Data

US 2017/0139061 A1  May 18, 2017

(30) Foreign Application Priority Data

Nov. 17, 2015  (CN) .......................... 2015 1 0795192

(51) Int. Cl.
*G01T 1/29* (2006.01)
*G06F 7/24* (2006.01)
*G06F 7/36* (2006.01)

(52) U.S. Cl.
CPC .............. *G01T 1/2985* (2013.01); *G06F 7/24* (2013.01); *G06F 7/36* (2013.01)

(58) Field of Classification Search
None
See application file for complete search history.

(56) References Cited

U.S. PATENT DOCUMENTS

2002/0116425 A1* 8/2002 Imai .......................... G06F 7/24
                                                               708/207
2003/0208495 A1   11/2003 Andreev et al.
(Continued)

FOREIGN PATENT DOCUMENTS

CN   101772212 A   7/2010
CN   103324857 A   9/2013
(Continued)

OTHER PUBLICATIONS

State Intellectual Property Office of the People's Republic of China, Office Action and Search Report Issued in Application No. 201510795192.4, dated Jul. 27, 2017, 15 pages. (Submitted with Partial Translation).

*Primary Examiner* — Gregory J Toatley, Jr.
*Assistant Examiner* — Terence E Stifter, Jr.
(74) *Attorney, Agent, or Firm* — McCoy Russell LLP (57) ABSTRACT

A method for determining a pair of compliance events is provided. A set of event data collected by a PET detector may be divided into N sub-sets, and each of the N sub-sets of event data may be sorted according to an occurrence time of each event included in the event data, wherein N is an integer greater than or equal to 2. A K stage heapsort may be performed on the sorted N sub-sets of event data according to the occurrence time of each event, so as to sequentially output data of each event in the sorting order, wherein K is an integer greater than or equal to 1. A time compliance determination and a space compliance determination may be performed on the sequentially-outputted event data, and a pair of compliance events may be determined if both the time compliance determination and the space compliance determination are passed.

8 Claims, 8 Drawing Sheets

(56) References Cited

U.S. PATENT DOCUMENTS

| | | | |
|---|---|---|---|
| 2003/0229630 A1 | 12/2003 | Kamath et al. | |
| 2005/0144167 A1* | 6/2005 | Yamamoto | G06F 7/36 |
| 2007/0168333 A1 | 7/2007 | Yu | |
| 2009/0127467 A1* | 5/2009 | Frach | G01T 1/2985 |
| | | | 250/363.03 |
| 2012/0011096 A1 | 1/2012 | Aggarwal | |
| 2012/0330979 A1* | 12/2012 | Elson | G06F 17/30988 |
| | | | 707/752 |
| 2014/0310317 A1 | 10/2014 | Spillane et al. | |
| 2016/0110121 A1* | 4/2016 | Singh | G06F 3/0613 |
| | | | 711/156 |

FOREIGN PATENT DOCUMENTS

| | | |
|---|---|---|
| CN | 103336683 A | 10/2013 |
| CN | 103455582 A | 12/2013 |
| CN | 103559015 A | 2/2014 |
| WO | 2007015198 A2 | 2/2007 |

* cited by examiner

DETERMINING A PAIR OF COMPLIANCE EVENTS

CROSS-REFERENCE TO RELATED APPLICATIONS

The present application claims priority to Chinese Patent Application No. 201510795192.4, filed on Nov. 17, 2015, the entire contents of which are hereby incorporated by reference for all purposes.

BACKGROUND

The present disclosure is directed to determining a pair of compliance events for Positron Emission Tomography (PET).

When using PET, a tracer having positrons may be injected into a subject. Annihilation may occur if the positrons e+ released by the tracer during the decay process interact with negative electrons e− existing within the subject so as to generate a pair of γ photons having the same energy (approximately 511 KeV) and opposite propagation directions (about 180 degrees). Such events may be called positron annihilation events. The γ photons generated in the above-mentioned positron annihilation events may be detected by using a PET detector. Typically, a detection of a γ photon detected by the PET detector may be called a detection of an event, and a detection of two γ photons from the same positron annihilation event may be called a detection of a pair of compliance events. An occurrence position of the annihilation may be determined by detecting compliance events, and thus a concentration distribution of the tracer within the subject may be obtained by analysing existence of positrons.

When determining a pair of compliance events, processes of several stages, for example a sorting, a time compliance, and a space compliance, may be performed on the event data collected by the PET detector in order to finally obtain the compliance event. The process of the sort may be a time-consuming and storage-consuming step and usually may be implemented by storage sorting algorithms, wherein each of the events may be sorted according to occurrence times.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer.

BRIEF DESCRIPTION OF DRAWINGS

Features of the present disclosure are illustrated by way of example and not limited in the following figures, in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures may have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Figure 1:
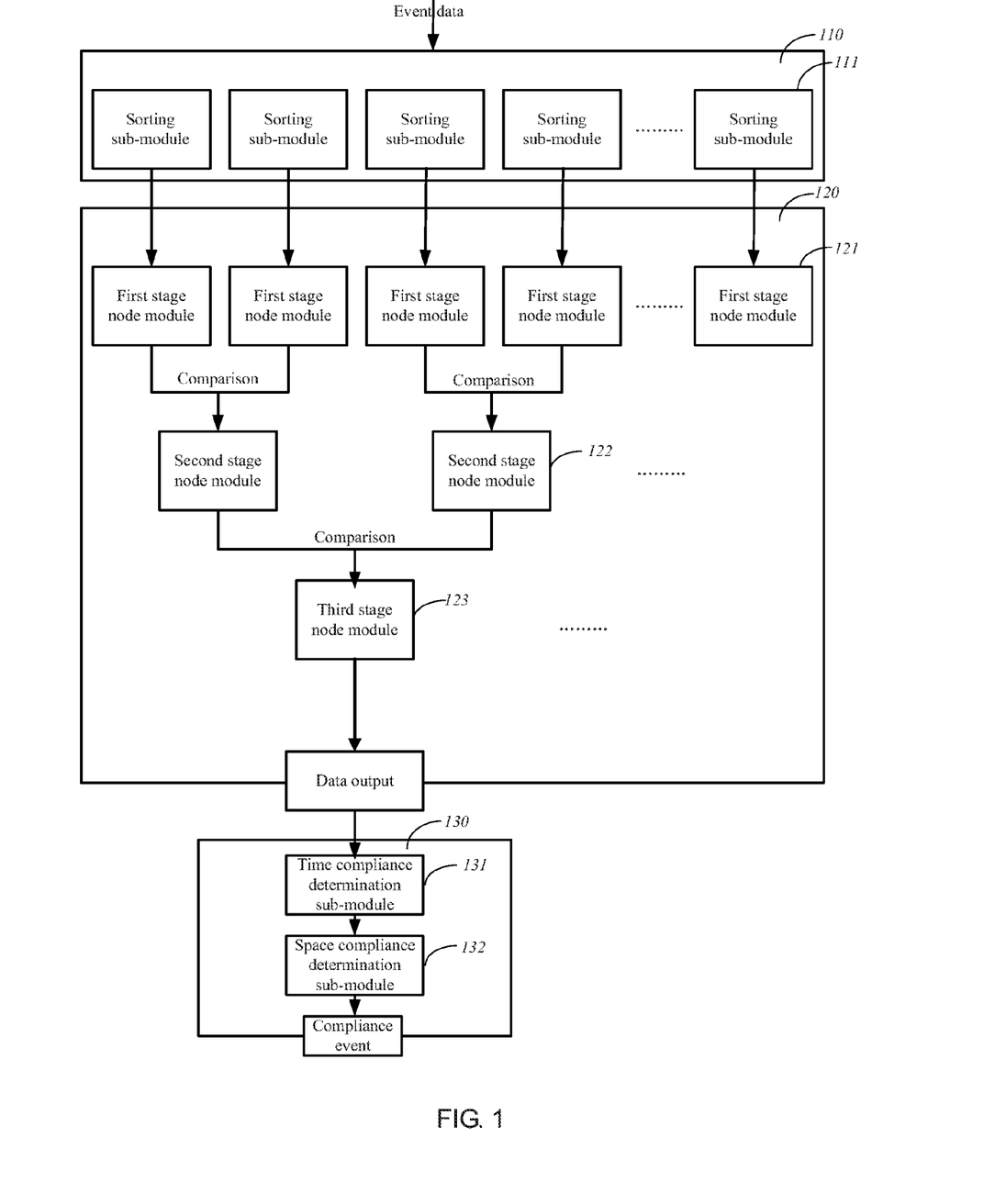
FIG. 1 is a schematic diagram of an application system framework for determining a pair of compliance events according to an example of the present disclosure.

With the improvement of time accuracy of PET devices, the amount of sets of event data collected by PET detectors may be increased significantly. An example method for determining a pair of compliance events is provided in the present disclosure, and may be useful for determining a pair of compliance events more quickly in the case of large amounts of data. Referring to FIG. 1, a schematic diagram of an application system framework for determining a pair of compliance events, according to an example of the present disclosure, is shown. A device for determining a pair of compliance events within this application system framework may in some examples perform a compliance determination event process on a set of event data collected by a PET detector, until a pair of compliance events is determined.

As shown in FIG. 1, an example for determining a pair of compliance events may include three major phases including, but not limited to: "sorting", "time compliance" and "space compliance". For example, sorting as referred to herein means that a set of event data collected by the PET detector may be sorted according to a sequence for occurrence time of each event (e.g., from the earliest occurrence time to the latest occurrence time). After sorting, the time compliance determination and the space compliance determination may be performed. For example, two events which satisfy both of the time compliance and the space compliance may be determined as a pair of compliance events. As shown in FIG. 1, a first sorting module 110 and a second sorting module 120 may be used to achieve the sorting process of a set of event data in the present disclosure. In other words, two stages of sorting may be performed. Subsequent to sorting, the events may be sequentially sent to a compliance determination module 130 for performing the time compliance determination and the space compliance determination according to a certain sorting order. For example, the time compliance determination and the space compliance determination may be performed from the earliest occurrence time to the latest occurrence time.

Figure 2:
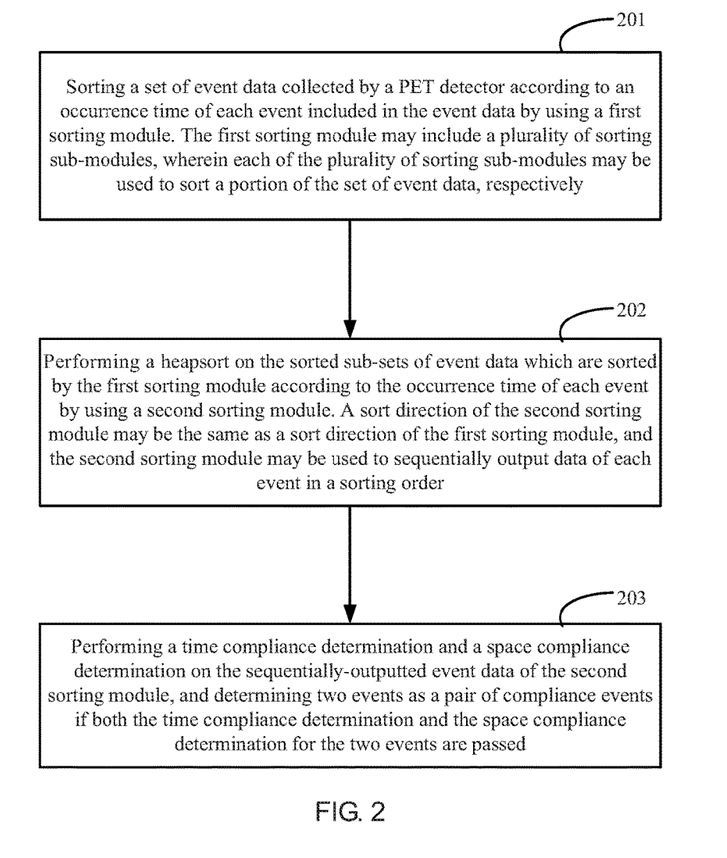
FIG. 2 is a flowchart illustrating the operating procedures of a method for determining a pair compliance events according to an example of the present disclosure.

Referring to FIG. 2, a flowchart illustrating the operating procedures of a method for determining a pair of compliance events according to an example of the present disclosure, is shown. In some examples, the operating procedures may be performed by the device for determining a pair of compliance events shown in FIG. 1, and may include the steps illustrated in blocks 201-203.

At block 201, a set of event data collected by a PET detector may be sorted according to an occurrence time of each event included in the event data by using a first sorting module 110. The first sorting module 110 may further include a plurality of sorting sub-modules 111, where each of the plurality of sorting sub-modules 111 may be used to sort a portion of the set of event data, respectively.

As shown in FIG. 1, the first sorting module 110 may distribute sorting operations for the set of event data collected by the PET detector to the plurality of sorting sub-modules 111. For example, assuming that there are 56 sets of event data collected by the PET detector and there are 8 sorting sub-modules 111, each sorting sub-module 111 may perform a sort on 7 subsets of event data. This distributed sorting mode may reduce the amount of simultaneously-sorted event data, thereby improving a sorting speed with respect to a data centralized sorting mode.

At block 202, a heapsort (also called a tree sort) may be performed on the sorted sub-sets of event data, which are sorted by the first sorting module 110 according to the occurrence time of each event, by using a second sorting module 120. A sort direction of the second sorting module 120 may be the same as a sort direction of the first sorting module 110, and the second sorting module 120 may be used to sequentially output data of each event in a sorting order.

For example, at block 202, the sort direction may be an ascending sort direction or a descending sort direction, which is equivalent to indicating a predetermined order to be sorted. It may be noted that, the sort direction at block 202 may be consistent with the sort direction at block 201. The second sorting module 120 may be mainly used to re-sort all sub-sets of event data on the basis of the sorted result of the first sorting module 110. A heapsort may be adopted by the second sorting module 120, wherein a sorting may be performed while the event data is being output.

As shown in FIG. 1, for example, the second sorting module 120 may include multi-stage node modules, such as, a first stage node module 121, a second stage node module 122, etc. Assume that a sub-set of event data output from each of the sorting sub-modules 111 of the first sorting module 110 is sorted in an ascending order. First, each of the sorting sub-modules 111 may push a selected piece of event data of earliest occurrence time to the corresponding connected first stage node module 121. A comparison may be performed on sub-sets of event data of two first stage node modules 121, and the earlier event data may be outputted to its corresponding connected second stage node module 122. Similarly, a comparison may be performed on the sub-sets of event data of two second stage node modules 122, and the earlier event data may be outputted to its corresponding connected third stage node module 123, and so on, until the earliest event data may be used as an output data of the second sorting module 120 to be sent to a compliance determination module 130. During this process, a part of first stage node modules 121 are idle, and their corresponding connected sorting sub-modules 111 may continue to push a sub-set of event data to perform the above-described comparison procedures. Finally, a second output data may be outputted by the second sorting module 120, wherein the second output data is a second earliest output data. Detailed procedures will be described in the following examples.

As can be seen from the above-described example, the process of the second sorting module 120 is similar to a pipeline operation, which the sub-sets of event data pushed from the sorting sub-module 111 to the first stage node module 121 may be used as an input of the second sorting module 120, and the sub-sets of event data sent to the compliance determination module 130 may be used as the output of the second sorting module 120. As can be seen from the description of above-described process, the second sorting module 120 may input a sub-set of event data while outputting a sub-set of event data simultaneously, which may greatly improve the processing speed of a sorting. Be noted that, the stages of the multi-stage node modules shown in FIG. 1 are not limited to three stages, which are for illustrative purposes only. The sort direction of the second sorting module 120 may be the same as the sort direction of the first sorting module 110, which indicates that their sorting orders may be the same, for example, both of them may sort each set of event data according to an ascending order.

At block 203, a time compliance determination and a space compliance determination may be performed on the sequentially-outputted event data of the second sorting module 120 by using the compliance determination module 130, and two events may be determined as a pair of compliance events when both the time compliance determination and the space compliance determination with respect to the two events are passed.

At this block 203, the process of the time compliance determination and the space compliance determination may be performed according to conventional manners, and further description is omitted herein. As shown in FIG. 1, the compliance determination module 130 may include a time compliance determination sub-module 131 and a space compliance determination sub-module 132. The time compliance determination sub-module 131 may be seamlessly connected to the second sorting module 120. In other words, the time compliance determination sub-module 131 may directly perform a time compliance determination on a sub-set of event data outputted by the second sorting module 120. After that, the space compliance determination sub-module 132 may continue to perform the space compliance determination.

As can be seen from the whole compliance event determination device shown in FIG. 1, the first sorting module 110 at the top may adopt a plurality of sorting sub-modules 111 for distributing sorting processes of a set of event data. After a heapsort may be performed by the second sorting module 120, only a sub-set of event data may be eventually outputted at a certain time, for example, the second sorting module 120 may output a sub-set of event data to the compliance determination module 130 at every clock cycle. This structure is similar to tree branches, and the branch structure may have more branches at the top and less branches at the root. Therefore, the device for determining a pair of compliance events of the present disclosure may be called a branch-structure-based compliance event determination device. This branch structure may save resources with respect to a multi-parallel channel sorting compliance mode.

As can been seen from the application system framework shown in FIG. 1 and the flowchart shown in FIG. 2, when the device for determining a pair of compliance events of the present disclosure may be used to perform a compliance determination, a pipeline operation for simultaneously sorting and determining a pair of compliance events may be basically achieved. As such, the processes of a sorting, a time compliance, and a space compliance may be seamlessly performed. This pipeline operation mode may in some examples save a large number of data storage resources and time consumption, which may thus improve the processing speed.

As discussed below, an example may be used to describe the operating procedures of a method for determining a pair of compliance events of the present disclosure.

Figure 3:
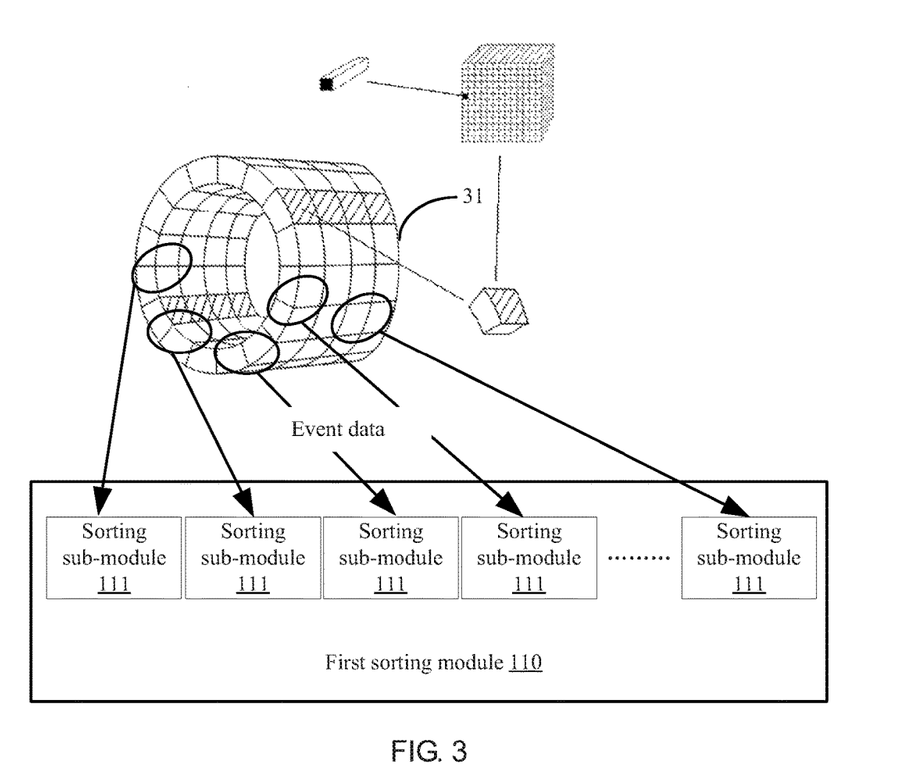
FIG. 3 is a block diagram of a first sorting module shown in FIG. 1 according to an example of the present disclosure.

Referring to FIG. 3, a block diagram of a first sorting module, as shown in FIG. 1, according to an example of the present disclosure, is shown. As illustrated in FIG. 3, each of the sorting sub-modules 111 of the first sorting module 110 may receive a set of event data collected by a PET detector 31, wherein the event indicates that the γ photons generated in the positron annihilation event may be detected by a certain crystal of the PET detector 31. The set of event data may include a received time of the γ photons, an energy of the γ photons, a position for receiving the γ photons, etc. The received time of the γ photons may refer to the event occurrence time of the present disclosure, and the position for receiving the γ photons may refer to an event occurrence position, wherein a time compliance determination may be performed according to the event occurrence time, and a space compliance determination may be performed according to the event occurrence position. In an example of the present disclosure, a sorting of a set of event data may be performed according to occurrence time of each event (for example, a set of event data may be sorted by time). It may be noted that, a set of data sorting and outputting in an example is based on a unit of one event. For example, a certain set of event data may be outputted, and event data of two events may be used to determine whether these two events are compliance events.

From the point of view of space, the event data received by each of the sorting sub-modules 111 of the first sorting module 110 may correspond to a certain portion of a set of event data collected by the PET detector 31. In an example, one detector block may correspond to one sorting sub-module 111, and the set of event data of this detector block may be sent to the corresponding sorting sub-module 111. From the point of view of time, the set of event data collected by the PET detector 31 may be divided into several sub-sets of event data located in a plurality of time segments. For example, assuming that one time segment may be 250 ns, the event data that occurred within a certain 250 ns may be correspondingly received by each of the sorting sub-modules 111 shown in FIG. 3, in order to perform the operating procedures shown in FIG. 2. When the sorting of all sub-sets of event data within a certain 250 ns is completed (that is, all sub-sets of event data may be sent to the compliance determination module 130), the first sorting module 110 may sort all sub-sets of event data within a next 250 ns. If a sorting time for sorting all sub-sets of event data within a time segment (including a processing time of the first sorting module 110 and a processing time of the second sorting module 120, until all sub-sets of event data within the time segment are sent to the compliance determination module 130) is greater than the time segment, a cache may be disposed in the sorting sub-module 111. Be noted that, in order to avoid data overflow of the cache, a duration of the positron-negative electron annihilation, a data amount of triggered events, and a processing time difference may be considered for determining a reasonable size of the cache.

In this example, assuming that there are totally 8 sorting sub-modules 111 (merely an example, in practice, there may be more than 8 sorting sub-modules 111), and assuming that each of the sorting sub-modules 111 may receive 7 sub-sets of event data within a time segment, the device for determining a pair of compliance events may perform a compliance event determination on 7*8=56 sub-sets of event data within a time segment. The operating procedures of the 56 sub-sets of event data performed by each module of the device for determining a pair of compliance events, are respectively described as below.

Figure 4:
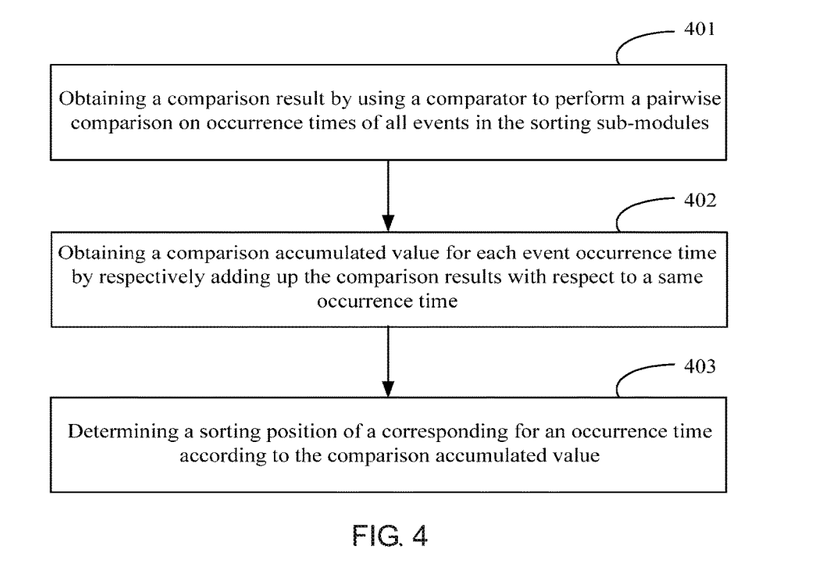
FIG. 4 is a flowchart illustrating the operating procedures of a sorting sub-module shown in FIG. 3 according to an example of the present disclosures.

It may be understood that, in the first sorting module 110, each of the sorting sub-modules 111 may sort each of the sub-sets of event data according to the same sorting order. FIG. 4 is a flowchart illustrating the operating procedures of a sorting sub-module 111, shown in FIG. 3, according to an example of the present disclosure, which may include the following blocks 401-403.

At block 401, a comparison result may be obtained by using a comparator to perform a pairwise comparison on occurrence times of all events in the sorting sub-modules 111. For example, the sorting of each sub-set of the event data may be performed according to the event occurrence times, and thus a comparison between the event occurrence times is mainly adopted. At this block, a comparison may be performed between the event occurrence times of every two events for determining the sequence of the event occurrence times in order to obtain a comparison result.

At block 402, a comparison accumulated value for each event occurrence time may be obtained by respectively adding up the comparison results with respect to a same occurrence time. For example, an occurrence time of a predetermined event in the sorting sub-module 111 may be taken as an example, and a comparison may be performed between the predetermined sub-set of event data and other sub-sets of event data in the sorting sub-module 111 at block 401 in order to obtain the corresponding comparison result. All comparison results corresponding to the occurrence time of the predetermined event may be added up in order to obtain a value, and the obtained value may be called a comparison accumulated value corresponding to the occurrence time of the predetermined event. Each occurrence time (i.e., each event) in the sorting sub-module 111 may correspond to a comparison accumulated value, respectively.

At block 403, a sorting position of a corresponding event for an occurrence time may be determined according to the comparison accumulated value. At this block, a sorting may be performed on the event occurrence times of the sorting sub-module 111 according to the comparison accumulated value obtained at the block 402, wherein a sorting number of a predetermined comparison accumulated value in an accumulated value sequence may indicate the sorting position of the corresponding predetermined event occurrence time in all event occurrence times (i.e., the sorting position of the predetermined event corresponding to the predetermined event occurrence time in all events).

The sorting procedures shown in FIG. 4 are described in the following example. Assume that a certain sorting sub-module 111 may perform a sorting on the following 7 sub-sets of event data {10, 70, 50, 50, 80, 30, 100} (these event data are merely an example, and comparison principles of event data are the same), and set that A0=10, A1=70, A2=50, A3=50, A4=80, A5=30, A6=100. In this example, the purpose of the sorting sub-module 111 is for sorting the above-described 7 sub-sets of event data in an ascending order. In this example, four clock cycles may be used to complete the sorting of these 7 sub-sets of event data, which is shown as below.

At a first clock cycle, the operations of the pairwise comparison mentioned at block 401 may be performed. For example, the pairwise comparison at this block may be implemented by a hardware, such as a comparator implemented by Field-Programmable Gate Array (FPGA). In this example, since 7 sub-sets of event data may be sorted in an ascending order, a less than comparator may be adopted and a comparison rule may be specified in advance. For example, if a number Am is compared with a number An, and Am<An, then the comparison result Zmn=0; otherwise, Zmn=1. In the following description, "<=" represents an assignment.

if $(A0 < A1)$ $Z01 <= 0$; else $Z01 <= 1$;

if $(A0 < A2)$ $Z02 <= 0$; else $Z02 <= 1$;

...

if $(A1 < A2)$ $Z12 <= 0$; else $Z12 <= 1$;

if $(A1 < A3)$ $Z13 <= 0$; else $Z13 <= 1$;

...

if $(A2 < A3)$ $Z23 <= 0$; else $Z23 <= 1$;

if $(A2 < A4)$ $Z24 <= 0$; else $Z24 <= 1$;

...

if $(A3 < A4)$ $Z34 <= 0$; else $Z34 <= 1$;

if $(A3 < A5)$ $Z35 <= 0$; else $Z35 <= 1$;

...

if $(A4 < A5)$ $Z45 <= 0$; else $Z45 <= 1$;

if $(A4 < A6)$ $Z46 <= 0$; else $Z46 <= 1$;

if $(A5 < A6)$ $Z56 <= 0$; else $Z56 <= 1$.

The Table-1 below illustrates a comparison result of these 7 sub-sets of event data. Be noted that, the value of "Z SUM" in the last column of Table-1 may be calculated at the second clock cycle, which is merely an example herein.

Optionally, when the number Am is compared with the number An and m>n, it may mean that the comparison already appeared in a previous operation. For example, a first comparison may have been performed on these two sub-sets of event data, but its comparison direction may be different. For example, when a first comparison is performed on the number Am and the number An, the comparison result of the first comparison may indicate that Am<An. If a second comparison is performed on the number An and the number Am, the comparison result of the second comparison will indicate that An≥Am. In other words, the comparison result of the first comparison may be inverted to be the comparison result of the second comparison. By adopting such comparison, half of comparators may be saved. For example, the comparison result in the bottom left portion of the above-described Table-1 may be obtained by directly inverting the comparison result in the upper right portion of the Table-1, and thus totally $C_N^{N-1}$ comparators may be required. Herein, N is the number of sub-sets of event data in the sorting sub-module 111. In this example, 7*6/2=21 comparators total are required.

At a second clock cycle, the operations of adding up the comparison results in order to obtain a comparison accumulated value mentioned at block 402 may be performed. In the following description, "<=" represents an assignment, and "~" represents an inverted value.

AND0<=Z01+Z02+Z03+Z04+Z05+Z06;

AND1<=~Z01+Z12+Z13+Z14+Z15+Z16;

AND2<=~Z02+~Z12+Z23+Z24+Z25+Z26;

AND3<=~Z03+~Z13+~Z23+Z34+Z35+Z36;

AND4<=~Z04+~Z14+~Z24+~Z34+Z45+Z46;

AND5<=~Z05+~Z15+~Z25+~Z35+~Z45+Z56;

AND6<=~Z06+~Z16+~Z26+~Z36+~Z46+~Z56.

The operations of determining a sorting position of a corresponding event according to the comparison accumulated value mentioned at block 403 may be completed through two clock cycles. At the third clock cycle, the input values may be the initial 7 sub-sets of event data to be sorted from A0 to A6, which may be assigned to their corresponding sorting arrays CH[n].

$CH[AND0] <= A0$;

$CH[AND1] <= A1$;

TABLE 1

Comparison Result

| | A0 = 10 | A1 = 70 | A2 = 50 | A3 = 50 | A4 = 80 | A5 = 30 | A6 = 100 | Z SUM |
|---|---|---|---|---|---|---|---|---|
| A0 = 10 | | 0 | 0 | 0 | 0 | 0 | 0 | 0 |
| A1 = 70 | 1 | | 1 | 1 | 0 | 1 | 0 | 4 |
| A2 = 50 | 1 | 0 | | 1 | 0 | 1 | 0 | 3 |
| A3 = 50 | 1 | 0 | 0 | | 0 | 1 | 0 | 2 |
| A4 = 80 | 1 | 1 | 1 | 1 | | 1 | 0 | 5 |
| A5 = 30 | 1 | 0 | 0 | 0 | 0 | | 0 | 1 |
| A6 = 100 | 1 | 1 | 1 | 1 | 1 | 1 | | 6 |

-continued

```
CH[AND2] <= A2;
...
```

At the fourth clock cycle, the sorting of the sequence may be ended, and the smallest Z sum value in the sequence is 0.

```
OUT0 <= CH[0]; // The smallest value
OUT1 <= CH[1]; // The second smallest value
...
```

For example, at the third clock cycle, if AND0=1, AND1=2 and AND2=0, then the above-described sorting arrays CH[n] may be written as: CH[1]=A0, CH[2]=A1 and CH[0]=A2. Therefore, at the fourth clock cycle, the sub-sets of event data A2, A0 and A1 may be sequentially outputted according to the sorting order of CH[0], CH[1] and CH[2], and then the sorting may be ended.

In the above-described example, each sorting sub-module 111 may complete the sort of 7 sub-sets of event data within four clock cycles, such that the 7 sub-sets of event data may be sorted in an ascending order very quickly. Then, the process of the second sorting module 120 is started as below.

Figure 5:
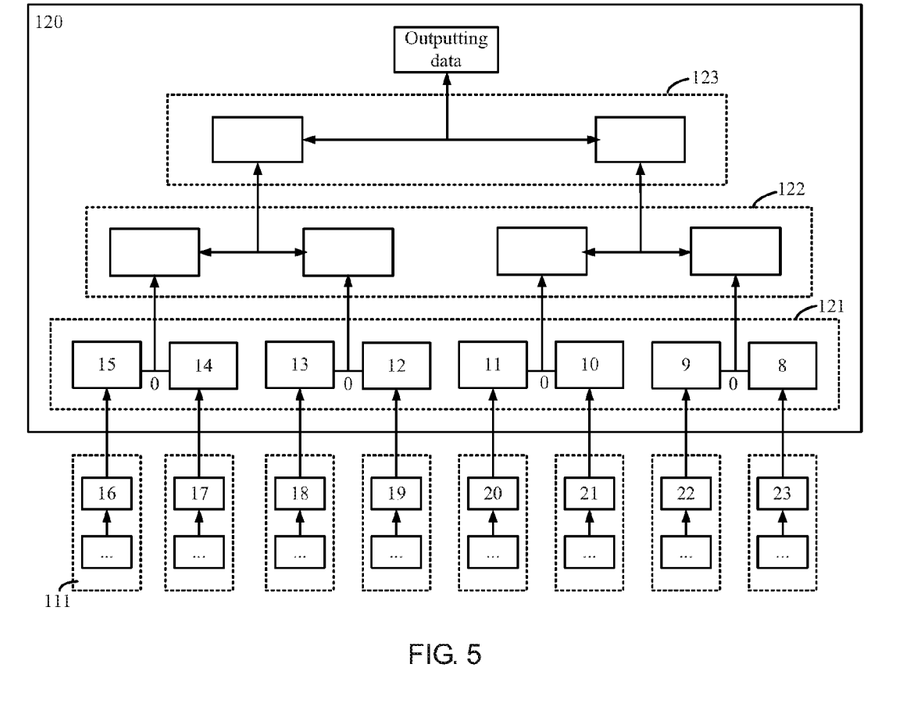
FIG. 5 is a schematic diagram showing a first sorting status of a second sorting module shown in FIG. 1 according to an example of the present disclosure.

In order to describe the sorting process of the second sorting module 120 more preferably, the following example is explained in conjunction with FIG. 5 to FIG. 8, wherein each of the figures FIG. 5 to FIG. 8 corresponds to a clock cycle. In this example, each sorting sub-module 111 may handle 7 sub-sets of event data, and three stage node modules may be designed in the second sorting module 120. Referring to FIG. 5, FIG. 5 is a schematic diagram showing a first sorting status of a second sorting module shown in FIG. 1 according to an example of the present disclosure. As shown in FIG. 5, 8 first stage node modules 121 may be respectively connected to 8 sorting sub-modules 111, 4 second stage node modules 122, and 2 third stage node modules 123, and finally a sub-set of event data is outputted.

At the first clock cycle, the sort of the 7 sub-sets of event data in each sorting sub-module 111 may be understood to have been completed, and it may further be understood that the sorting order is an ascending order in this example. During the first clock cycle, each sorting sub-module 111 may push a sub-set of event data to the corresponding connected first stage node module 121, such that a sub-set of event data is filled in each first stage node module 121, such as the sub-sets of event data identified from 8 to 15 shown in FIG. 5 (these are merely data identifications, and do not represent actual data values). At this time, there may be no sub-set of event data filled in the second stage node module 122 and the third stage node module 123. For the sorting sub-module 111, the earliest sub-set of event data in the sorted sequence may be pushed to the first stage node module 121. After the earliest sub-set of event data is pushed to the first stage node module 121, the second earliest sub-set of event data may be pushed to the corresponding connected first stage node module 121, such as the sub-sets of event data identified from 16 to 23 shown in FIG. 5.

In an example, in order to sequentially push the sub-sets of event data upward, comparison flags may be set in this example. In FIG. 5, one comparison flag may be set for every two first stage node modules 121, which may represent a comparison result of the two digits. For example, "0" may represent that the right digit is less than the left digit; on the other hand, "1" may represent that the right digit is greater than or equal to the left digit. In this example, the smaller digit may be pushed to the upper stage node module.

Figure 6:
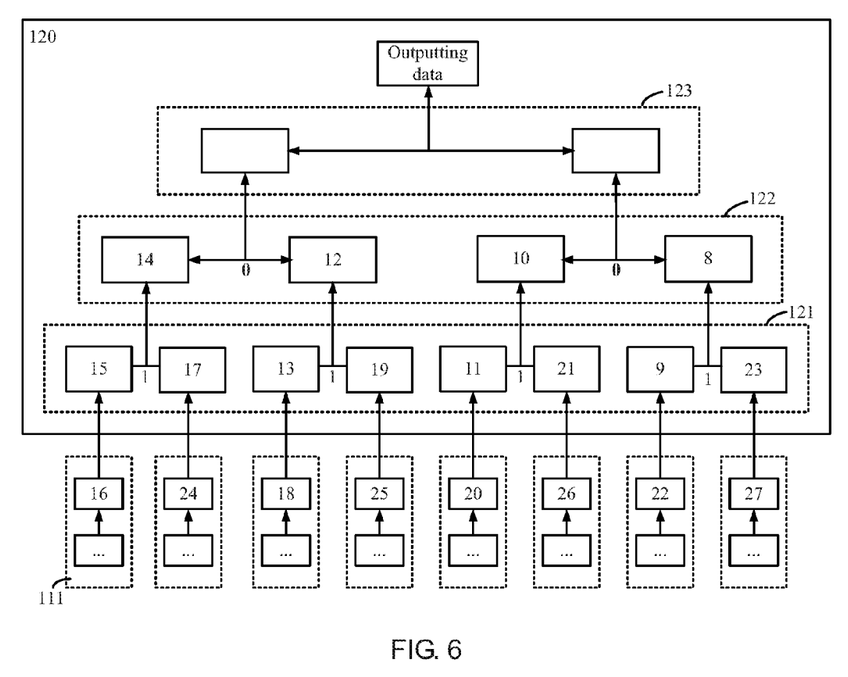
FIG. 6 is a schematic diagram showing a second sorting status of a second sorting module shown in FIG. 1 according to an example of the present disclosure.

Referring to FIG. 6, FIG. 6 is a schematic diagram showing a second sorting status of a second sorting module shown in FIG. 1 according to an example of the present disclosure. At the second clock cycle, the second stage node modules 122 may be started to be filled. Two first stage node modules 121 may be connected to one second stage node module 122, and one of the sub-sets of event data of the two first stage node modules 121 may be outputted to the second stage node module 122 according to the comparison result. By combining the comparison flags shown in FIG. 5, if the comparison flag is "0", the right digit may be pushed to the second stage node module 122. In the meantime, after a sub-set of event data is pushed to the second stage node module 122, a part of first stage node modules 121 may be idle. At this time, the corresponding sorting sub-modules 111 may continue to push a sub-set of event data to the idle first stage node modules 121, and the comparison flags may be updated.

Figure 7:
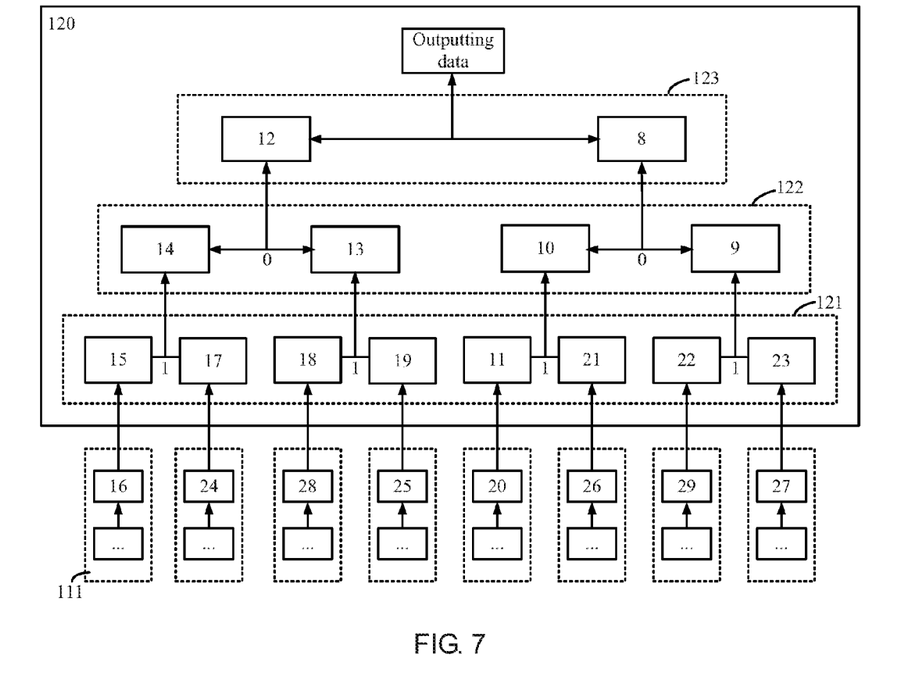
FIG. 7 is a schematic diagram showing a third sorting status of a second sorting module shown in FIG. 1 according to an example of the present disclosure.

Referring to FIG. 7, FIG. 7 is a schematic diagram showing a third sorting status of a second sorting module shown in FIG. 1 according to an example of the present disclosure. At the third clock cycle, each of the stage node modules may continue to push a sub-set of event data to the upper stage. For example, two second stage node modules 122 may be connected to one third stage node module 123, and the smaller sub-set of event data of the two second stage node modules 122 may be outputted to the corresponding connected third stage node module 123 according to the comparison flag. Similarly, after a sub-set of event data is pushed to the third stage node module 123 by the second stage node module 122, the second stage node module 122 may be idle. At this time, the corresponding first stage node module 121 may continue to push a sub-set of event data to the idle second stage node module 122, which the smaller sub-set of event data of the two first stage node modules 121 may be pushed according to the comparison flag. In the meantime, the sorting sub-module 111 may push a sub-set of event data to the idle first stage node module 121. After the sub-set of event data is pushed, the comparison flag may be updated for preparing the next push.

Figure 8:
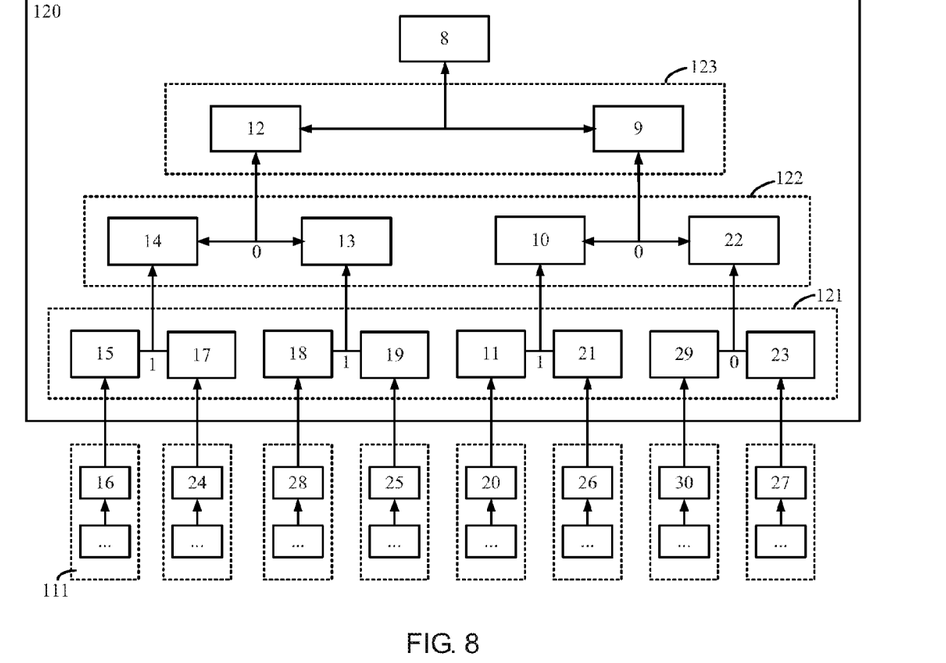
FIG. 8 is a schematic diagram showing a fourth sorting status of a second sorting module shown in FIG. 1 according to an example of the present disclosure.

Referring to FIG. 8, FIG. 8 is a schematic diagram showing a fourth sorting status of a second sorting module shown in FIG. 1, according to an example of the present disclosure. At the fourth clock cycle, the third stage node module 123 may continue to push sub-sets of event data upward, such that the earliest sub-set of event data may be obtained as the output data to be sent to the compliance determination module 130. Similarly, the lower stage node modules 121 and 122 may continue to push sub-sets of event data to their upper stage node modules 122 and 123, and the comparison flags may be updated.

As can be seen from the above-described procedures, the data output speed of the second sorting module 120 may be a sub-set of data per clock cycle. In an example, assuming that there are totally 8 sorting sub-modules 111, and 7 sub-sets of event data may be cached in each of the sorting sub-modules 111, therefore, 56+3=59 clock cycles total may be required if all sub-sets of event data are sent to the compliance determination module 130 (i.e., all sub-sets of event data may be sorted and outputted by the second sorting module 120). As can be seen from the above description, since the stages of the stage node modules is 3, and 3 clock cycles are increased herein. The above procedures also reflect a pipeline operation for simultaneously sorting and outputting the event data in this example.

For the first sorting module 110 and the second sorting module 120 in this example, if the total consumption time from all sub-sets of event data being sorted by the sorting sub-module 111 until all sub-sets of event data being outputted by the second sorting module 120 is greater than a time segment, a cache may be assigned to each sorting sub-module 111 in order to avoid data overflow.

For example, if a number of the sorting sub-modules 111 is set to M, and a sub-set of data number of each sorting sub-module 111 is set to N, the processing time from all sub-sets of event data being sorted by the first sorting module 110 until all sub-sets of event data being sent to the second sorting module 120 may be four clock cycles; and the consumption time for pushing all sub-sets of event data from the second sorting module 120 to the compliance determination module 130 may be M*N+3 clock cycles; and thus the total consumption time may be M*N+7 clock cycles. In this example, assume that a processing clock frequency is 250 MHz, the clock cycle is 4 ns, the time segment is 200 ns, 8 sorting sub-modules 111 are used at the same time, and each of the sorting sub-modules 111 has 7 sub-sets of event data, the total consumption time is 63 clock cycles (i.e., 252 ns). Since 252 ns is greater than a time segment 200 ns, a cache of each sorting sub-module 111 may be increased. Be noted that, in order to avoid data overflow occurred in the cache, a duration of the positron-negative electron annihilation, a data amount of triggered events, and a processing time difference may be considered for determining a reasonable size of the cache in the sorting sub-module 111.

A time compliance determination and a space compliance determination may continue to be performed on the sub-sets of event data outputted by the second sorting module 120, wherein two events may be determined as a pair of compliance events when both the time compliance determination and the space compliance determination with respect to the two events are passed. The compliance determination at this stage may be performed according to conventional manners, which is briefly described as below.

Referring to FIG. 1, the time compliance determination sub-module 131 may activate time windows for taking the events located in a same time window as a time compliance pair to be outputted. If a dataset cache exists, at least two sub-sets of event data may be stored in the dataset cache for determining a time difference between a time window start event and a next event. If the time difference is smaller than a time window, it may represent that these two sub-sets of events are located in a same time window and may not be processed temporarily. Then the time compliance determination sub-module 131 may continue to receive a still next sub-set of event until an event not located in the same time window is found. Therefore, the dataset located in the same time window may be determined as a preparatory compliance pair. If the time difference is greater than the time window, the start event may be discarded and the next event may be updated as a new start event. Thus, the original time window start event becomes an event not located in the same time window with the preparatory compliance pair, and so on. Then, the process may be performed according to a number of events of the preparatory compliance pair. For example, if the number of events of the preparatory compliance pair is 2, it may represent that the number of events located in the same window is 2, and the sub-sets of event data of the preparatory compliance pair may be directly sent to the space compliance determination sub-module 132. If the number of events of the preparatory compliance pair is 3 or more, a selection process may be performed according to a predetermined compliance mode and then the processed sub-sets of event data may be sent to the space compliance determination sub-module 132.

The space compliance determination sub-module 132 may adopt different stalls having different address differences for performing determination. That is to say, only when the address differences between the sub-sets of event data of the preparatory compliance pair is greater than a pre-set stall threshold, the preparatory compliance pair may be recognized as a correct compliance pair.

Figure 9:
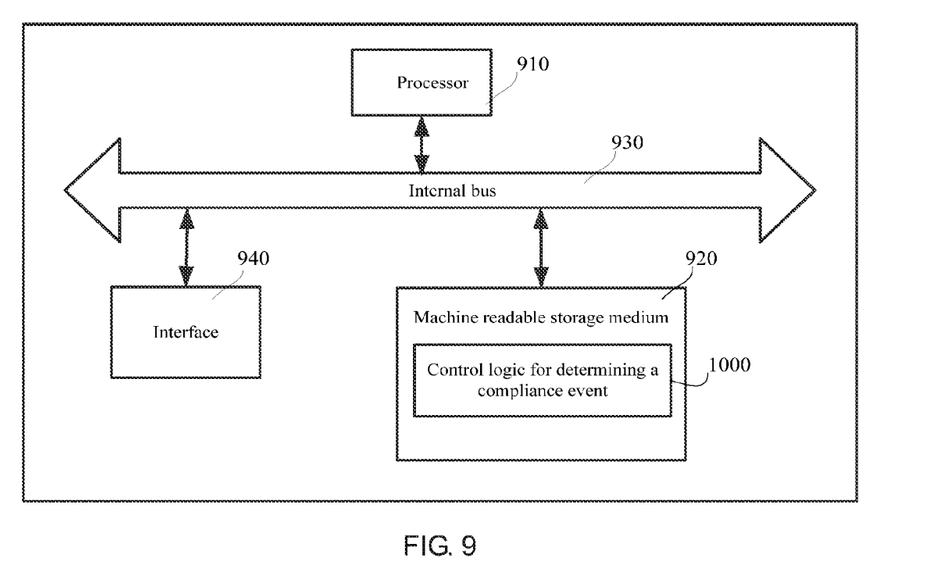
FIG. 9 is a hardware architecture diagram of a device for determining a pair of compliance events device according to an example of the present disclosure.

In accordance with the above-described method for determining a pair of compliance events, a device for determining a pair of compliance events is provided in the present disclosure. As shown in FIG. 9, the device for determining a pair of compliance events may include a processor 910 and a machine readable storage medium 920, wherein the processor 910 may be connected to the machine readable storage medium 920 through an internal bus 930. In other possible implementations, the device for determining a pair of compliance events may further include an external interface 940 for communicating with other devices or components, such as a support.

In different examples, the machine readable storage medium 920 may be Random Access Memory (RAM), volatile memory, non-volatile memory, flash memory, storage drives (such as, a hard drive), solid state drive, any type of storage disks (such as, CD-ROM, DVD, etc.), or similar storage medium, or a combination thereof.

In an example, the machine readable storage medium 920 may be used to store machine readable instructions corresponding to a control logic 1000 for determining a pair of compliance events. As shown in FIG. 1, the control logic 1000 may include a first sorting module 110, a second sorting module 120, and a compliance determination module 130.

The first sorting module 110 may include a plurality of sorting sub-modules 111. Each of the plurality of sorting sub-modules 111 may be used to respectively receive a portion of sets of event data collected by a PET detector and to sort the portion of event data according to an occurrence time of each event included in the event data.

The second sorting module 120 may be used to perform a heapsort on the sorted sub-sets of event data sorted by the first sorting module 110 according to the occurrence time of each event. A sort direction of the second sorting module 120 may be the same as a sort direction of the first sorting module 110, and the second sorting module 120 may be used to sequentially output data of each event in a sorting order.

The compliance determination module 130 may be used to perform a time compliance determination and a space compliance determination on the sequentially-outputted event data of the second sorting module 120, and to determine two events as a pair of compliance events when both the time compliance determination and the space compliance determination with the two events are passed.

The second sorting module 120 may include multi-stage node modules, and the multi-stage node modules may be used to perform the operations below:

through a plurality of first stage node modules 121, the sub-sets of event data sequentially outputted according to a sorting order by the corresponding connected sorting sub-modules 111 of the first sorting module 110 may be received, wherein one sorting sub-module 111 may be connected to one first stage node module 121;

through a plurality of second stage node modules 122, one of the sub-sets of event data outputted by performing a comparison on two sub-sets of event data of two corresponding connected first stage node modules 121 may be obtained; and through a plurality of third stage node modules 123, one of the sub-sets of event data outputted by performing a comparison on two sub-sets of event data of two corresponding connected second stage mode modules 122 may be obtained, and so on, until data of each event in the first sorting module 110 are outputted.

In an example, when performing a time compliance determination on the sub-sets of event data sequentially outputted by the second sorting module 120, the compliance determination module 130 may be used to output data of two events which are located in a same time window as a time compliance pair of events by activating time windows.

Figure 10:
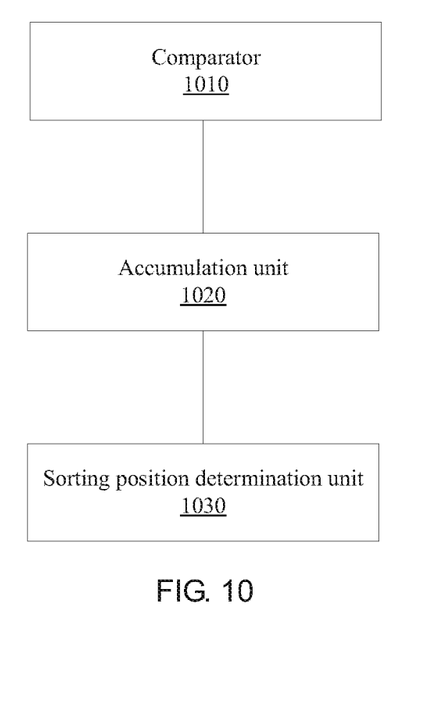
FIG. 10 is a block diagram of a sorting sub-module according to an example of the present disclosure.

Referring to FIG. 10, FIG. 10 is a block diagram of a sorting sub-module according to an example of the present disclosure. As shown in FIG. 10, the sorting sub-module 111 may include a comparator 1010, an accumulation unit 1020, and a sorting position determination unit 1030.

The comparator 1010 may be used to obtain a comparison result by performing a pairwise comparison on occurrence times of all events in each of the sorting sub-module 111.

The accumulation unit 1020 may be used to obtain a comparison accumulated value for each event occurrence time by respectively adding up the comparison results with respect to a same occurrence time.

The sorting position determination unit 1030 may be used to determine a sorting position of the corresponding occurrence time of each event according to the comparison accumulated value.

In an example, when performing a pairwise comparison on occurrence times of all events in each of the sorting sub-module 111, the comparator 1010 may be further used to convert a first comparison result to be a second comparison result, in a case a first pairwise comparison has been performed on two occurrence times in a first direction and a second pairwise comparison in a contrary direction of the first direction is to be performed on the two occurrence times.

According to another example, each of the modules (including the multi-stage sorting module, the time compliance module, and the space compliance module) of the present disclosure may be implemented by using logic units of hardware devices, wherein the hardware devices may be programmable logic devices, such as, Field-Programmable Gate Array (FPGA), Complex Programmable Logic Device (CPLD) and the like. For example, the data sorting process of the sorting sub-module 111 in the first sorting module 110 may be implemented by using a less than comparator of FPGA.

The example below is implemented with software, which describes how the device for determining a pair of compliance events runs the control logic 1000. In this example, the control logic 1000 of the present disclosure may be understood as machine readable instructions stored in the machine readable storage medium 920. When the processor 910 of the device for determining a pair of compliance events of the present disclosure executes the control logic 1000, the processor 910 executes corresponding machine readable instructions of the control logic 1000 stored in the machine readable storage medium 920 to:

divide a set of event data collected by a PET detector into N sub-sets, wherein N is an integer greater than or equal to 2, and where the set of event data includes information of each of a plurality of events;

sort each of the N sub-sets of event data in a sorting order according to an occurrence time of each event included in the event data;

perform a K stage heapsort on the sorted N sub-set event data according to the occurrence time of each event, so as to sequentially output data of each event in a sorting order, wherein K is an integer greater than or equal to 1, N is equal to 2 to the power of K (2^K);

perform a time compliance determination and a space compliance determination on the sequentially-outputted event data; and determine two events as a pair of compliance events in a case both the time compliance determination and the space compliance determination with respect to the two events are passed.

According to an example, when dividing a set of event data collected by a PET detector into N sub-sets, and sorting each of the N sub-sets of event data according to occurrence times of each event included in the event data, said machine readable instructions further cause the processor 910 to:

obtain a comparison result by performing a pairwise comparison on occurrence times of all events in each sub-set of the event data;

obtain a comparison accumulated value for each occurrence time in each of the sub-set of the event data by respectively adding up the comparison results with respect to a same occurrence time; and determine a sorting position of each event in each sub-set of event data according to the comparison accumulated value for each occurrence time.

In an example, when performing a pairwise comparison on occurrence times of all events in each sub-set of the event data, said machine readable instructions further cause the processor 910 to invert a first comparison result to be a second comparison result of the second pairwise comparison in a case a first pairwise comparison has been performed on two occurrence times in a first direction and a second pairwise comparison in a contrary direction of the first direction is to be performed on the two occurrence times.

According to another example, when performing a K stage heapsort on the on the sorted N sub-sets of event data according to the occurrence time of each event, so as to sequentially output data of each event in a sorting order, said machine readable instructions further cause the processor 910 to:

perform a comparison on first events in every two sorted sub-sets of event data, and output data of one of the first events according to the sorting order as a first stage output;

perform a comparison on every two of the first stage outputs, and output one of the first stage outputs according to the sorting order as a second stage output;

perform a comparison on every two of the second stage outputs, and output one of the second stage outputs according to the sorting order as a third stage output, until data of each event in the sorted N sub-sets of event data are outputted.

According to another example, when performing a time compliance determination on the sequentially-outputted event data, said machine readable instructions further cause the processor 910 to cache the sequentially-outputted event data, and output data of two events which are located in a same time window as a time compliance pair of events.

The above are only preferred examples of the present disclosure and are not intended to limit the disclosure within the spirit and principles of the present disclosure. Any changes made, equivalent replacement, or improvement in the protection of the present disclosure should contain within the range of examples presented in the disclosure herein.

The methods, processes and units described herein may be implemented by hardware (including hardware logic circuitry), software or firmware or a combination thereof. The term 'processor' is to be interpreted broadly to include a processing unit, ASIC, logic unit, or programmable gate array, or etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product may be stored in a storage medium and may comprise a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for determining a pair of compliance events, the method comprising:
    scanning a subject by a Positron Emission Tomography (PET) detector to obtain a set of event data;
    dividing the set of event data into N sub-sets, wherein N is equal to 2 to a power of K ($2^K$), K is an integer greater than or equal to 1 and the set of event data includes information of each of a plurality of events;
    sorting each of the N sub-sets of event data in a sorting order according to an occurrence time of each event included in the event data;
    performing a K stage heapsort on all the sorted N sub-sets of event data according to the occurrence time of each event, and sequentially outputting each event data in the heapsort order;
    performing a time compliance determination and a space compliance determination on the sequentially-outputted event data;
    determining two events as a pair of compliance events in a case both the time compliance determination and the space compliance determination with respect to the two events are conformed; and
    reconstructing a PET image based on the pair of compliance events;
    wherein said performing a K stage heapsort on all the sorted N sub-sets of event data according to the occurrence time of each event, and sequentially outputting each event data in the heapsort order comprises:
        performing a first comparison on first events in every two sorted sub-sets of event data, and outputting data of one of the first events according to the sorting order as a first stage output;
        performing a second comparison on every two of the first stage outputs, and outputting one of the first stage outputs according to the sorting order as a second stage output; and
        performing a third comparison on every two of the second stage outputs, and outputting one of the second stage outputs according to the sorting order as a third stage output, until data of each event in the sorted N sub-sets of event data are outputted.

2. The method according to claim 1, wherein said sorting each of the N sub-sets of event data in a sorting order according to an occurrence time of each event included in the event data comprises:
    obtaining a comparison result by performing a pairwise comparison on occurrence times of all events in each sub-set of the event data;
    obtaining a comparison accumulated value for each occurrence time in each of the sub-sets of the event data by respectively adding up the comparison results with respect to a same occurrence time; and
    determining a sorting position of each event in each sub-set of event data according to the comparison accumulated value for each occurrence time.

3. The method according to claim 2, wherein, in a case a first pairwise comparison has been performed on two occurrence times in a first direction and a second pairwise comparison in a contrary direction of the first direction is to be performed on the two occurrence times, a second comparison result of the second pairwise comparison is obtained by converting a first comparison result of the first pairwise comparison.

4. The method according to claim 1, wherein said performing a time compliance determination on the sequentially-outputted event data comprises:
    caching the sequentially-outputted event data; and
    outputting data of two events which are located in a same time window as a time compliance pair of events.

5. A device for determining a pair of compliance events, the device comprising:
    a processor which invokes machine readable instructions corresponding to a control logic for determining a pair of compliance events stored on a storage medium and executes the machine readable instructions to:
        obtain a set of event data from a PET detector, wherein the PET detector is configured to collect the set of event data by scanning a subject;
        divide the set of event data into N sub-sets, wherein N is equal to 2 to a power of K ($2^K$), K is an integer greater than or equal to 1 and the set of event data includes information of each of a plurality of events;
        sort each of the N sub-sets of event data in a sorting order according to an occurrence time of each event included in the event data;

perform a K stage heapsort on all the sorted N sub-sets of event data according to the occurrence time of each event, and sequentially output each event data in the heapsort order, wherein K is an integer greater than or equal to 1;

perform a time compliance determination and a space compliance determination on the sequentially-outputted event data;

determine two events as a pair of compliance events in a case both the time compliance determination and the space compliance determination with respect to the two events are conformed; and reconstruct a PET image based on the pair of compliance events;

wherein said performing a K stage heapsort on all the sorted N sub-sets of event data according to the occurrence time of each event, and sequentially outputting each event data in the heapsort order, said machine readable instructions further cause the processor to:

perform a first comparison on first events in every two sorted sub-sets of event data, and output data of one of the first events according to the sorting order as a first stage output;

perform a second comparison on every two of the first stage outputs, and output one of the first stage outputs according to the sorting order as a second stage output; and perform a third comparison on every two of the second stage outputs, and output one of the second stage outputs according to the sorting order as a third stage output, until data of each event in the sorted N sub-sets of event data are outputted.

6. The device according to claim 5, wherein sorting each of the N sub-sets of event data in a sorting order according to a occurrence time of each event included in the event data, said machine readable instructions further cause the processor to:

obtain a comparison result by performing a pairwise comparison on occurrence times of all events in each sub-set of the event data;

obtain a comparison accumulated value for each occurrence time in each of the sub-sets of the event data by respectively adding up the comparison results with respect to a same occurrence time; and determine a sorting position of each event in each sub-set of event data according to the comparison accumulated value for each occurrence time.

7. The device according to claim 6, wherein, in a case a first pairwise comparison has been performed on two occurrence times in a first direction and a second pairwise comparison in a contrary direction of the first direction is to be performed on the two occurrence times, a second comparison result of the second pairwise comparison is obtained by converting a first comparison result of the first comparison.

8. The device according to claim 5, wherein, in a case performing a time compliance determination on the sequentially-outputted event data, said machine readable instructions further cause the processor to:

cache the sequentially-outputted event data, and output data of two events which are located in a same time window as a time compliance pair of events.

* * * * *